United States Patent
Priess et al.

(10) Patent No.: US 11,059,338 B2
(45) Date of Patent: Jul. 13, 2021

(54) STRUT BEARING FOR BEARING A STRUT ON A MOTOR VEHICLE BODY AND A METHOD FOR CONFIGURING CHASSIS OF MOTOR VEHICLES

(71) Applicants: THYSSENKRUPP BILSTEIN GMBH, Ennepetal (DE); thyssenkrupp AG, Essen (DE)

(72) Inventors: Jens Priess, Oberhausen (DE); Daniel Wieners, Bochum (DE); Ralf Burdinski, Bochum (DE)

(73) Assignees: thyssenkrupp Bilstein GmbH, Ennepetal (DE); thyssenkrupp AG, Essen (DE)

( * ) Notice: Subject to any disclaimer, the term of this patent is extended or adjusted under 35 U.S.C. 154(b) by 260 days.

(21) Appl. No.: 16/305,319

(22) PCT Filed: May 29, 2017

(86) PCT No.: PCT/EP2017/062881
§ 371 (c)(1),
(2) Date: Nov. 28, 2018

(87) PCT Pub. No.: WO2017/207482
PCT Pub. Date: Dec. 7, 2017

(65) Prior Publication Data
US 2020/0317015 A1    Oct. 8, 2020

(30) Foreign Application Priority Data

Jun. 1, 2016   (DE) .................... 10 2016 209 590.0

(51) Int. Cl.
*B60G 15/06*   (2006.01)
*B62D 17/00*   (2006.01)
*F16C 29/02*   (2006.01)

(52) U.S. Cl.
CPC ........... *B60G 15/067* (2013.01); *B62D 17/00* (2013.01); *F16C 29/02* (2013.01);
(Continued)

(58) Field of Classification Search
CPC .......... B60G 15/06; B60G 15/067–068; B60G 2200/46; B60G 2200/4622;
(Continued)

(56) References Cited

U.S. PATENT DOCUMENTS 5,697,632 A * 12/1997 Burman ................... B60G 9/00
                                                                    280/86.751
9,073,577 B2 * 7/2015 Croutcher ............ B60G 15/068
(Continued)

FOREIGN PATENT DOCUMENTS

CN        1222119 A      7/1999
CN       104553657 A     4/2015
(Continued)

OTHER PUBLICATIONS

English Translation of International Search Report issued in PCT/EP2017/062881, dated Aug. 16, 2017.

*Primary Examiner* — Paul N Dickson
*Assistant Examiner* — Caitlin Anne Miller
(74) *Attorney, Agent, or Firm* — thyssenkrupp North America, LLC

(57) ABSTRACT

A strut bearing may help bear a strut on a vehicle body and set and adjust camber at the strut of a wheel suspension. The strut bearing may include a fixing means, a releasable clamping connection between the strut bearing and the vehicle body, a strut receiver, and an adjustment device. The adjustment device may comprise a sliding block with a guide element, a bearing plate with a guide element receiver forming a linear guide of the sliding block with the guide element together with the guide element receiver, and a
(Continued)

clamping plate. The bearing and clamping plates and the sliding block may be arranged such that the sliding block is clamped between the bearing and clamping plates. The strut receiver may be arranged on the sliding block such that a position of the sliding block in the linear guide correlates with the setting of the camber at the strut.

10 Claims, 2 Drawing Sheets

(52) U.S. Cl.
CPC .... *B60G 2200/46* (2013.01); *B60G 2204/128* (2013.01); *B60G 2204/418* (2013.01); *B60G 2204/419* (2013.01); *B60G 2204/61* (2013.01)

(58) Field of Classification Search
CPC ........ B60G 2200/464; B60G 2204/128; B60G 2204/61; B60G 13/003; B62D 17/00

USPC .................................................... 280/86.751
See application file for complete search history.

(56) References Cited

U.S. PATENT DOCUMENTS

2008/0303233 A1* 12/2008 Dugandzic ........... B60G 15/068
                                                                    280/86.751
2015/0091268 A1   4/2015 Croutcher

FOREIGN PATENT DOCUMENTS

| DE | 196 36 719 A     | 3/1997  |
|----|------------------|---------|
| DE | 20 2005 018 496 U| 2/2006  |
| JP | 2010-264779 A    | 11/2010 |
| JP | 5801025 B        | 10/2015 |
| WO | 2009/082776 A    | 7/2009  |

* cited by examiner

STRUT BEARING FOR BEARING A STRUT ON A MOTOR VEHICLE BODY AND A METHOD FOR CONFIGURING CHASSIS OF MOTOR VEHICLES

CROSS REFERENCE TO RELATED APPLICATIONS

This application is a U.S. National Stage Entry of International Patent Application Serial Number PCT/EP2017/062881, filed May 29, 2017, which claims priority to German Patent Application No. DE 10 2016 209 590.0, filed Jun. 1, 2016, the entire contents of both of which are incorporated herein by reference.

FIELD

The present disclosure generally relates to motor vehicles, including strut bearings for bearing a strut on motor vehicle bodies and methods for configuring chassis of motor vehicles.

BACKGROUND

Strut bearings for bearing a strut on a motor vehicle body are known in a plurality of embodiments from the prior art. A strut bearing, in particular also known as a camber plate, is part of the suspension of motor vehicles. It is situated above the spring on the strut. The strut bearing connects the strut, in particular comprising the damper and the spring, to the body of the vehicle. Also, strut bearings are an important design element in the axle suspension, and help ensure an optimal contact between the tire and the road surface. Furthermore, strut bearings increase comfort because they isolate rolling and road noise from the body. Also, the chassis of motor vehicles, in particular the camber, can be configured via an adjustment device arranged on the strut bearing. The angle between the wheel center plane and the vertical on the road surface is called the camber. There is a distinction between camber relative to the road surface and camber relative to the vehicle. In a system mounted fixedly on the vehicle, the camber is positive if the top of the wheel is angled towards the outside. In cars, a slight negative camber of all wheels is generally common, since this achieves a higher maximal lateral guidance force on corners.

DE 20 2005 018 496 U1 describes an adjustable strut bearing with two intermeshing cylindrical plates which can be displaced axially relative to each other.

The problem with the embodiments known from the prior art is that to configure the chassis of motor vehicles, in particular the camber, the axle strut must be removed and dismantled. In particular, removal requires raising the vehicle to a height at which the wheels of the vehicle lose contact with the ground. For removal, the wheels of the vehicle must also be removed.

Thus a need exists for an improved strut bearing and/or an improved method for configuring chassis of motor vehicles. In particular, a need exists for an improved strut bearing and/or an improved method for configuring chassis of motor vehicles that make it possible to adjust the chassis of a vehicle, in particular the camber, without having to remove and/or dismantle the axle strut. Furthermore, a need exists for a time-saving and fine adjustment of the camber.

DETAILED DESCRIPTION

Figure 1:
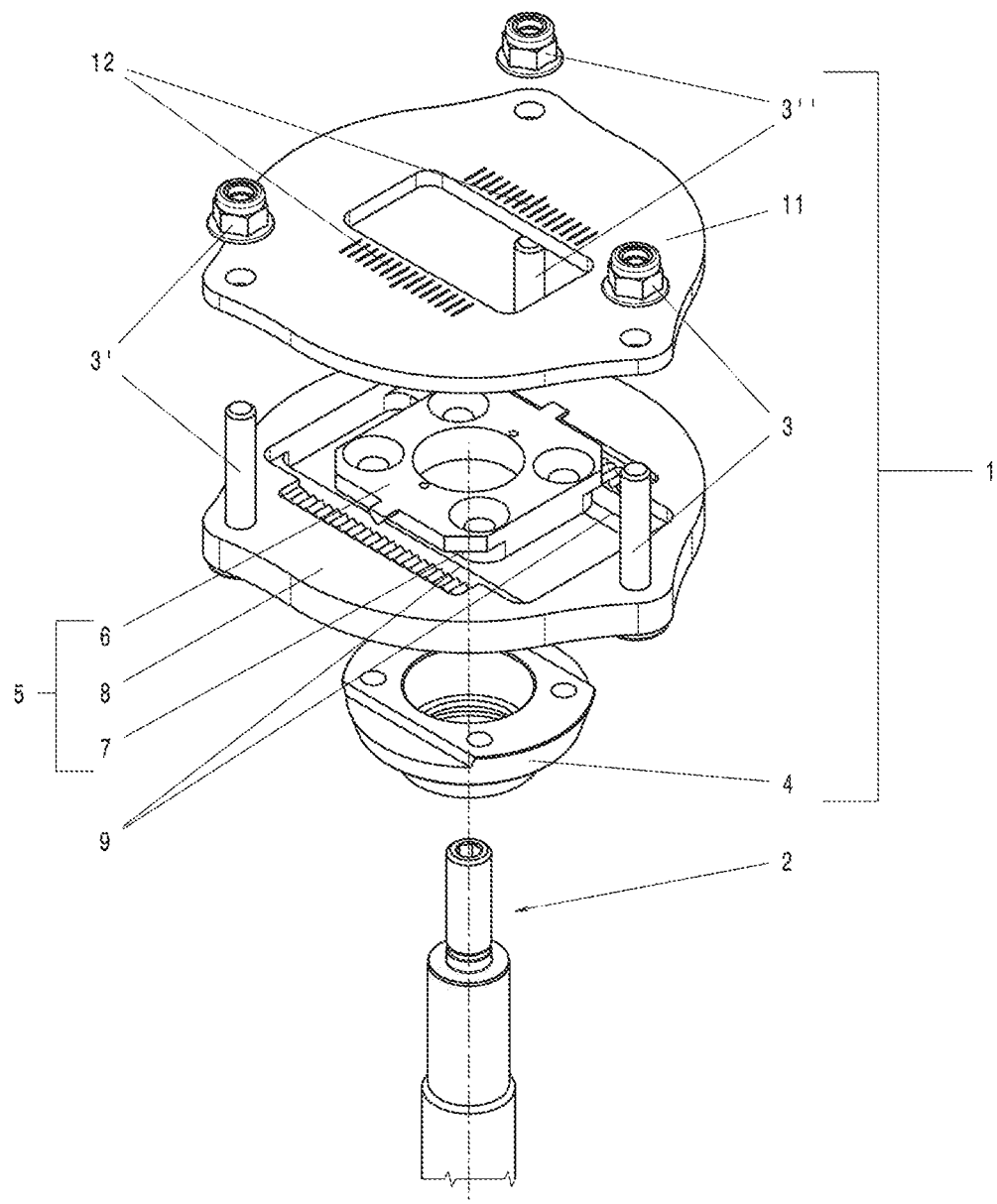
FIG. 1 is a diagrammatic, exploded, oblique view through an example strut bearing.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The strut bearing according to the invention, in comparison with conventional strut bearings, has the advantage that chassis can be configured, in particular the camber set, without removing and dismantling the axle strut. The strut bearing according to the invention furthermore offers a simple and precise possibility for configuring chassis, in particular for setting camber. Also, the camber can be set without adjusting the tracking of a vehicle. In particular, chassis can be configured, such as for example a camber can be set, while the vehicle is standing on the ground. In other words, the vehicle need not be raised to a height at which the wheels of the motor vehicle lose contact with the ground.

The method according to the invention for configuring chassis of motor vehicles, in comparison with the conventional method for configuring chassis, has the advantage that the chassis can be adjusted, in particular the camber can be set, without having to remove and dismantle the axle strut. In this way, a time-saving setting of the camber becomes possible. Furthermore, the method according to the invention provides a simple and precise possibility for configuring chassis. Also, the camber can be set without adjusting the tracking of a vehicle. In particular, chassis can be configured, for example camber can be set, while the vehicle is standing on the ground. In other words, the motor vehicle need not be raised to a height at which the wheels of the motor vehicle lose contact with the ground.

The strut bearing according to the invention for bearing a strut on a motor vehicle body and for setting and adjusting the camber at the strut of a wheel suspension, comprises at least one fixing means, wherein by means of the fixing means, at least one releasable clamping connection, in particular a screw connection, can be formed between the strut bearing and the vehicle body, also a strut receiver and an adjustment device, wherein the adjustment device comprises at least one sliding block with at least one guide element, a bearing plate with at least one guide element receiver forming a linear guide of the at least one sliding block with the at least one guide element together with the at least one guide element receiver, wherein the adjustment device also has a clamping plate, wherein the bearing plate, the at least one sliding block and the clamping plate are arranged relative to each other such that the at least one sliding block can be fixed at least by clamping between the bearing plate and the clamping plate, and wherein the strut receiver is arranged on the at least one sliding block such that the position of the at least one sliding block in the linear guide correlates with the setting of the camber at the strut.

A further object of the invention is a method for setting and adjusting the camber of motor vehicles, comprising the following steps:

a) provision of a strut with a strut end arranged on the side facing away from the wheel,
b) provision of a strut bearing comprising a strut receiver for receiving the strut end of the strut provided in step a), an adjustment device comprising at least one sliding block with at least one guide element, a bearing plate with at least one guide element receiver forming a linear guide of the at least one sliding block with the at least one guide element together with the at least one guide element receiver, wherein the adjustment device also comprises a clamping plate, wherein the bearing plate, the at least one sliding block and the clamping plate are arranged relative to each other such that the at least one sliding block can be fixed at least by clamping between the bearing plate and the clamping plate, and wherein the strut receiver is arranged on the at least one sliding block and the strut bearing has at least one fixing means, wherein by means of the fixing means, at least one releasable clamping connection, in particular a screw connection, is formed between the strut bearing and the vehicle body, wherein the clamping connection is additionally formed between the strut bearing and the adjustment device, wherein the clamping connection fixes the position of the at least one sliding block at least by clamping,
c) partial release of the at least one fixing means of the strut bearing provided in step b), wherein the at least one clamping connection is partially released and the strut bearing provided in step b) remains connected to the vehicle body, wherein the at least one sliding block of the strut bearing provided in step b) is displaceable in the adjustment device of the strut bearing provided in step b),
d) displacement of the at least one displaceable sliding block from step c) in the adjustment device, in the transverse direction to the vehicle longitudinal axis, for setting and/or adjusting the camber, while the clamping connection is partially released in step c),
e) tightening of the partially released at least one fixing means from step c), wherein the partially released clamping connection from step d) is at least partially recreated, wherein the at least one sliding block displaced in the adjustment device in step d) is fixed at least by clamping.

In the context of the present invention, the term "setting" means the setting the camber of a motor vehicle according to the data recommended by the vehicle manufacturer, in particular for standard vehicles. "Adjusting the camber" in the context of the present invention means setting the camber of the vehicle within a range which goes beyond the data recommended by the vehicle manufacturer, such as for example camber settings used in motor racing, rallying, stunt driving or combinations thereof.

The term "fixing means" in the context of the present invention refers to means which can form releasable connections. Examples of fixing means according to the invention are screw-nut connections, threaded stem and nut connections, stud bolt and nut connections, quick release connections, bolt and locking clamp connections or combinations thereof. In particular, for the screw connections listed below, the following tightening torques may be used: M8=13 Nm, M10=25 Nm, M12=45 Nm, M14=72 Nm, M16=110 Nm.

In the context of the present invention, the term "guide element" means an element arranged on a sliding block which, together with a guide element receiver, allows linear guidance of the sliding block. Examples of guide elements are an edge, a spring, a slide, a wire, a web or combinations thereof.

The term "guide element receiver" in the context of the present invention means an element receiver for receiving a guide element which, together with the guide element, allows a linear guidance of the sliding block. Examples of guide element receivers are a counter edge, a groove, a recess, a frame, a rail, a web, a roller or combinations thereof.

In the context of the present invention, a linear guidance means a rectilinear guidance of the guide element of a sliding block with the guide element receiver of the bearing plate. In particular, the direction of the linear guidance correlates with the transverse direction to the vehicle longitudinal axis.

In a particularly preferred embodiment of the invention, the at least one fixing means, which forms at least a releasable clamping connection with the strut bearing and the vehicle body, also fixes the at least one sliding block between the bearing plate and the clamping plate at least by clamping. For example, it is thereby possible that partial release of the at least one fixing means partially releases the at least one clamping connection, in particular between the bearing plate, the at least one sliding block at the clamping plate, and the strut bearing remains connected to the vehicle body, wherein the at least one sliding block of the strut bearing is displaceable in the adjustment device of the strut bearing. In particular, with the above-mentioned arrangement and fixing of the at least one fixing means, firstly the clamping connection is established between the strut bearing and the vehicle body, and secondly the clamping connection is established between the bearing plate, the at least one sliding block and the clamping plate.

In a preferred embodiment of the invention, the strut bearing comprises at least two, preferably three fixing means.

In a preferred embodiment of the invention, the adjustment device is arranged on the side facing or on the side facing away from the vehicle body, wherein the strut receiver rests against the strut bearing, in particular the adjustment device.

In the context of the present invention, the arrangement of the adjustment device on the side facing the vehicle body means that the vehicle body is arranged in order on the side after the clamping plate of the strut bearing. In contrast, in the context of the present invention, the arrangement of the adjustment device on the side facing away from the vehicle body means that the vehicle body is arranged in order on the side after the bearing plate of the strut bearing.

According to a further preferred embodiment of the invention, the guide element receiver is a guide frame, wherein the at least one sliding block is arranged inside the guide frame.

According to a further preferred embodiment of the invention, the bearing plate or the clamping plate and the at least one sliding block comprise single and/or multiple toothings which can be paired together at least by form fit, wherein the mutually paired single toothings and/or multiple toothings form an at least form-fit connection in the transverse direction to the vehicle longitudinal axis.

In a further embodiment of the invention, the single and/or multiple toothings are each formed from at least one tooth module. In particular, the modular formation allows one or more single toothing modules to be paired with one or more single toothing modules, and/or one or more multiple toothing modules to be paired with one or more multiple toothing modules.

In a further embodiment of the invention, the single and/or multiple toothings are formed as one or more oblique toothings.

According to a further embodiment of the invention, the clamping plate has at least one adjustment scale, wherein the adjustment scale is arranged such that the adjustment scale correlates with the position in which the strut receiver is arranged in the transverse direction to the vehicle longitudinal axis, in particular correlates with the camber.

In the context of the present invention, an adjustment scale is a display device for reading a value which correlates with the camber, in particular a camber value.

In a normal embodiment of the invention, the clamping plate is arranged on the side of the strut bearing facing the vehicle body, and the bearing plate is arranged on the side of the strut bearing facing away from the vehicle body.

According to a further embodiment of the invention, the clamping plate is arranged on the side of the strut bearing facing away from the vehicle body, and the bearing plate is arranged on the side of the strut bearing facing the vehicle body. The advantage of this embodiment is the easier configuration of chassis, such as for example setting of the camber, since the weight of the motor vehicle is not loaded on the strut bearing, and an improved clamping effect in driving, since the weight of the motor vehicle acts against the bearing plate and increases the clamping force. In this embodiment, to configure the chassis, such as for example to set the camber, the vehicle must be raised to a height at which the wheels of the motor vehicle no longer touch the floor, wherein the wheels of the motor vehicle need not be removed.

In a further embodiment of the invention, the bearing plate or the clamping plate and the at least one sliding block of the strut bearing provided in step b) also comprise single and/or multiple toothings which can be paired together at least by form fit, wherein after the displacement in step d), an engagement takes place in a further step dl), wherein additionally an at least form-fit connection is created in the transverse direction to the vehicle longitudinal axis.

The strut bearing according to the invention and the method according to the invention for configuring chassis of motor vehicles, in particular for setting and adjusting the camber at the strut of a wheel suspension, are explained with reference to the drawings.

FIG. 1 shows an oblique view through a strut bearing 1 according to one embodiment of the invention. The strut bearing 1 has a strut 2, a strut receiver 4 and an adjustment device 5. The adjustment device 5 comprises a bearing plate 8, a clamping plate 11 and a sliding block 6, wherein the sliding block 6 is arranged between the bearing plate 8 and the clamping plate 11. The sliding block 6 comprises a guide element 7, and the bearing plate 8 comprises a guide element receiver 9. The guide element 7 together with the guide element receiver 9 forms a linear guide of the sliding block 6. The strut bearing 1 is arranged on a vehicle body 10, 10' (not shown) by means of fixing means 3, 3', 3" such that the linear guide of the sliding block 6 runs in the transverse direction to the vehicle longitudinal axis. The vehicle fixing means 3, 3', 3" run from the bearing plate 8 through the clamping plate 11 and through the vehicle body 10, 10' (not shown). By means of the fixing means 3, 3', 3", the sliding block 6 can be fixed by clamping between the bearing plate 8 and the clamping plate 11. The guide element receiver 9 is formed as a guide frame, wherein the guide element receiver 9 has a single toothing and the sliding block 6 is arranged inside the guide frame. The sliding block 6 has a single toothing which can be paired with the single toothing of the guide element receiver 9. The strut receiver 4 is arranged on the sliding block 6 such that the position of the sliding block 6 in the linear guide correlates with the setting of the camber at the strut. An adjustment scale 12 is arranged on the clamping plate 11 such that the adjustment scale 12 correlates with the position in which the strut receiver 4 is arranged in the transverse direction to the vehicle longitudinal axis, in particular correlates with the camber.

Figure 2:
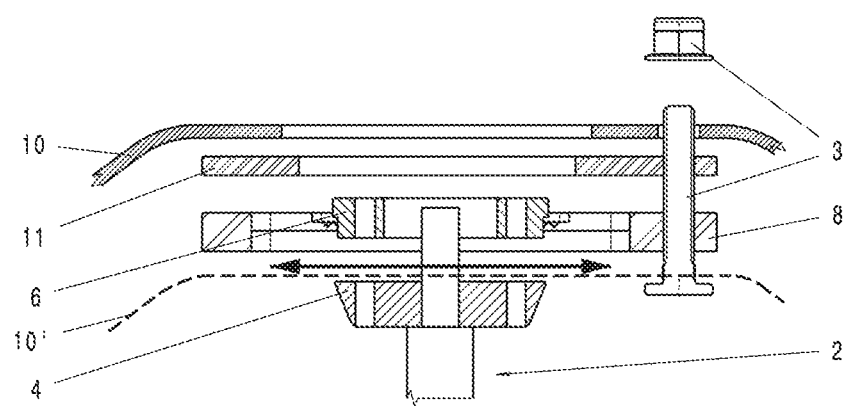
FIG. 2 is a diagrammatic, longitudinal, sectional view through an example strut bearing according to FIG. 1 with exemplary arrangements on a motor vehicle body.

FIG. 2 shows diagrammatically a longitudinal section through the strut bearing 1 according to FIG. 1 with exemplary arrangements on the vehicle body 10, 10' according to one embodiment of the invention. As an example, the vehicle body 10 is arranged on the clamping plate 11 or on the bearing plate 8. The double arrow shows the possible displacement direction of the sliding block 6 with the strut receiver 4 in the transverse direction to the vehicle longitudinal axis. The possible displacement direction is implemented by a spacing between the side of the strut receiver 4 facing the sliding block 6 and the side of the sliding block 6 facing the strut receiver 4, which is represented by a distance, in particular a clearance between the sliding block 6 and the strut receiver 4. For example, the distance is set to a desired distance value by fixing elements which connect the depicted mutually opposing openings of the sliding block 6 and strut receiver 4. For the adjustment function, it is clearly evident that when the sliding block 6 is connected to and spaced from the strut receiver 4, the possible displacement direction (indicated with the double arrow) of the sliding block 6 with the strut receiver 4 to the bearing plate 8, in particular in the transverse direction to the vehicle longitudinal axis, is possible as long as the sliding block 6 is not fixed between the bearing plate 8 and the clamping plate 11. Fixing may take place by the depicted engagement of the sliding block 6 with a paired toothing of the bearing plate, and/or a clamping connection which may be formed by clamping the sliding block 6 between the bearing plate 8 and the clamping plate 11 by means of the fixing means 3, 3', 3". In the fixing, also the side of the strut receiver 4 facing the sliding block 6 is spaced from the side of the sliding block 6 facing the strut receiver 4.

A strut bearing and method for configuring chassis of motor vehicles, in particular for setting and adjusting the camber at the strut of a wheel suspension of the type described above for vehicles, are used in production and/or maintenance of vehicles, in particular chassis of motor vehicles.

LIST OF REFERENCE SIGNS

1 Strut bearing
2 Strut
3, 3', 3" Fixing means
4 Strut receiver
5 Adjustment device
6 Sliding block
7 Guide element
8 Bearing plate
9 Guide element receiver
10, 10' Motor vehicle body
11 Clamping plate
12 Adjustment scale

What is claimed is:

1. A strut bearing for bearing a strut on a motor vehicle body and for setting and adjusting a camber at the strut of a wheel suspension, the strut bearing comprising:
   a fixing means;
   a releasable clamping connection, wherein by way of the fixing means the releasable clamping connection can be formed between the strut bearing and the motor vehicle body;
   a strut receiver; and
   an adjustment device that includes
      a sliding block with a guide element,
      a bearing plate with a guide element receiver forming a linear guide of the sliding block with the guide element together with the guide element receiver, wherein the guide element receiver is a guide frame, wherein the sliding block is disposed inside the guide frame, and
      a clamping plate, wherein the bearing plate, the sliding block, and the clamping plate are positioned relative to one another such that the sliding block can be fixed at least by clamping between the bearing plate and the clamping plate,
   wherein the strut receiver is disposed on the sliding block such that a position of the sliding block in the linear guide correlates with the setting of the camber at the strut.

2. The strut bearing of claim 1 wherein the adjustment device is disposed on a side facing the motor vehicle body, wherein the strut receiver rests against the strut bearing.

3. The strut bearing of claim 1 wherein the adjustment device is disposed on a side facing away from the motor vehicle body, wherein the strut receiver rests against the strut bearing.

4. The strut bearing of claim 1 wherein the bearing plate or the clamping plate and the sliding block comprise single or multiple toothings that can be paired together at least by form fit, wherein the paired single toothings or multiple toothings form a form-fit connection in a transverse direction to a longitudinal axis of the motor vehicle body.

5. The strut bearing of claim 4 wherein each of the single or multiple toothings is formed from at least one tooth module.

6. The strut bearing of claim 4 wherein the single or multiple toothings are formed as one or more oblique toothings.

7. The strut bearing of claim 1 wherein the clamping plate has an adjustment scale that is disposed such that the adjustment scale correlates with a position in which the strut receiver is disposed in a transverse direction to a longitudinal axis of the motor vehicle body.

8. The strut bearing of claim 1 wherein the clamping plate has an adjustment scale that is disposed such that the adjustment scale correlates with the camber.

9. A method for setting and adjusting camber of motor vehicles, the method comprising:
   providing a strut with a strut end disposed on a side facing away from a wheel;
   providing a strut bearing comprising
      a strut receiver for receiving the strut end,
      an adjustment device that includes a sliding block with a guide element, a bearing plate with a guide element receiver forming a linear guide of the sliding block with the guide element together with the guide element receiver, and a clamping plate, wherein the bearing plate, the sliding block, and the clamping plate are disposed relative to one another such that the sliding block can be fixed at least by clamping between the bearing plate and the clamping plate, wherein the strut receiver is disposed on the sliding block, wherein the guide element receiver is a guide frame and the sliding block is disposed inside the guide frame,
      a fixing means, and
      a releasable clamping connection, wherein by way of the fixing means the releasable clamping connection is formed between the strut bearing and a motor vehicle body, wherein the releasable clamping connection is formed between the strut bearing and the adjustment device, wherein the releasable clamping connection fixes a position of the sliding block at least by clamping;
   partially releasing the fixing means, wherein the releasable clamping connection is partially released and the strut bearing remains connected to the motor vehicle body, wherein the sliding block is displaceable in the adjustment device;
   displacing the sliding block in the adjustment device in a transverse direction to a longitudinal axis of the motor vehicle body for at least one of setting or adjusting camber, while the releasable clamping connection is partially released; and
   tightening the at least partially released fixing means, wherein the partially released releasable clamping connection is at least partially recreated, wherein the sliding block displaced in the adjustment device is fixed at least by clamping.

10. The method of claim 9 wherein the bearing plate or the clamping plate and the sliding block comprise single or multiple toothings that can be paired together at least by form fit, wherein after the displacement of the sliding block, the method comprises creating a form-fit connection in the transverse direction.

* * * * *